(12) United States Patent
He et al.

(10) Patent No.: US 12,527,982 B2
(45) Date of Patent: Jan. 20, 2026

(54) EXPLOSION-PROOF BOX FOR BATTERIES

(71) Applicant: CONTEMPORARY AMPEREX TECHNOLOGY (HONG KONG) LIMITED, Hong Kong (CN)

(72) Inventors: Xiong He, Fujian (CN); Feifei Liang, Fujian (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

(21) Appl. No.: 18/609,115

(22) Filed: Mar. 19, 2024

(65) Prior Publication Data
US 2024/0216734 A1    Jul. 4, 2024

Related U.S. Application Data

(63) Continuation of application No. PCT/CN2023/071494, filed on Jan. 10, 2023.

(30) Foreign Application Priority Data

Jan. 14, 2022 (CN) .......................... 202220091230.3

(51) Int. Cl.
*A62C 3/16* (2006.01)
*B65D 25/02* (2006.01)
(Continued)

(52) U.S. Cl.
CPC ............... *A62C 3/16* (2013.01); *B65D 25/02* (2013.01); *B65D 25/20* (2013.01);
(Continued)

(58) Field of Classification Search
CPC .. A62C 3/16; A62C 3/04; B65D 25/02; B65D 25/20; B65D 81/38; B65D 81/3823; B65D 85/68; B65D 2585/88
(Continued)

(56) References Cited

U.S. PATENT DOCUMENTS 2,707,721 A * 5/1955 Anderson ........... H01M 50/282
                                                          206/703
4,002,495 A     1/1977 Hakarine
(Continued)

FOREIGN PATENT DOCUMENTS

CN       202255517 U     5/2012
CN       103348505 A    10/2013
(Continued)

OTHER PUBLICATIONS

Office Action issued May 14, 2025 in Japanese Patent Application No. 2024-516531 with English translation thereof.
(Continued)

*Primary Examiner* — Bryon P Gehman
(74) *Attorney, Agent, or Firm* — XSENSUS LLP (57) ABSTRACT

An explosion-proof box for batteries is provided, including: an outer shell; an inner shell, the inner shell being positioned inside the outer shell; and a flame arresting device, the flame arresting device running through both the outer shell and the inner shell, where the flame arresting device includes: an exhaust passage configured to discharge gases generated within the inner shell to the outside of the outer shell; and recesses disposed on the inner surface of the exhaust passage for absorbing heat energy.

12 Claims, 2 Drawing Sheets

(51) Int. Cl.
   *B65D 25/20* (2006.01)
   *B65D 81/38* (2006.01)
   *B65D 85/68* (2006.01)
(52) U.S. Cl.
   CPC ......... *B65D 81/3823* (2013.01); *B65D 85/68* (2013.01); *B65D 2585/88* (2013.01)
(58) Field of Classification Search
   USPC ....................................................... 206/703
   See application file for complete search history.

(56) References Cited

U.S. PATENT DOCUMENTS

| | | | | |
|---|---|---|---|---|
| 4,013,190 | A | 3/1977 | Wiggins et al. | |
| 4,294,896 | A | 10/1981 | Ueda | |
| 8,647,762 | B2 * | 2/2014 | Schwab | H01M 10/653 |
| | | | | 206/703 |
| 8,795,863 | B2 * | 8/2014 | Naruse | H01M 10/482 |
| | | | | 206/703 |
| 11,799,162 | B2 * | 10/2023 | Zagrodnik | H01M 50/209 |
| 2017/0237054 | A1 | 8/2017 | Mast | |

FOREIGN PATENT DOCUMENTS

| CN | 106848124 A | 6/2017 |
|---|---|---|
| CN | 207409561 U | 5/2018 |
| CN | 208097156 U | 11/2018 |
| CN | 109249792 A | 1/2019 |
| CN | 210723191 U | 6/2020 |
| CN | 212343390 U | 1/2021 |
| CN | 112310552 A | 2/2021 |
| CN | 212461885 U | 2/2021 |
| CN | 112531254 A | 3/2021 |
| CN | 112599924 A | 4/2021 |
| CN | 214313377 U | 9/2021 |
| CN | 215119064 U | 12/2021 |
| CN | 216917096 U | 7/2022 |
| WO | 2013/020699 A2 | 2/2013 |

OTHER PUBLICATIONS

International Search Report and Written Opinion mailed on Apr. 6, 2023, received for PCT Application PCT/CN2023/071494, filed on Jan. 10, 2023, 12 pages including English Translation.

"Chinese National Standard GB/T 31387-2025 Ultra High Performance Concrete", Oct. 14, 2024 (See the machine English translation of Response to Notice of Reasons for Refusal, filed Oct. 27, 2025, as a concise explanation of relevancy in English).

Response to Notice of Reasons for Refusal, filed Oct. 27, 2025, in Japanese Patent Application No. 2024-516531 with machine English translation thereof.

* cited by examiner

EXPLOSION-PROOF BOX FOR BATTERIES

CROSS-REFERENCE TO RELATED APPLICATIONS

This application is a continuation of International Application No. PCT/CN2023/071494, filed Jan. 10, 2023, which claims the priority to Chinese Patent Application No. 202220091230.3, filed with the China National Intellectual Property Administration on Jan. 14, 2022 and entitled "EXPLOSION-PROOF BOX FOR BATTERIES", each of which is incorporated herein by reference in its entirety.

TECHNICAL FIELD

Embodiments of this application relate to the field of battery technologies, and in particular, to an explosion-proof box for batteries.

BACKGROUND

When transporting batteries, especially those that have already encountered problems, considerations arise on preventing battery combustion and explosion, and containing further damages. At present, an explosion-proof box is used under the condition that the energy of a battery product itself is controllable and safe, rather than blocking uncontrolled energy to prevent explosion after the internal energy of the battery is out of control, in order to prevent diffusion of the uncontrolled internal energy of the battery from threatening the safety of surrounding individuals and property.

TECHNICAL PROBLEMS

In view of the above problems, this application provides an explosion-proof box for batteries, so as to alleviate the safety problems arising from spread of flame in the event of combustion or explosion during battery transportation.

TECHNICAL SOLUTION

The following technical solutions are used in the embodiments of this application.

According to a first aspect, an explosion-proof box for batteries is provided. The explosion-proof box includes an outer shell, an inner shell positioned inside the outer shell, and a flame arresting device. The flame arresting device runs through both the outer shell and the inner shell. The flame arresting device includes an exhaust passage and recesses. The exhaust passage is configured to discharge gases generated within the inner shell to the outside of the outer shell. The recesses are disposed on the inner surface of the exhaust passage for absorbing heat energy.

In the technical solutions of the embodiments of this application, when a battery burns within the explosion-proof box, the energy from flame is insulated by the inner shell, allowing only a small amount of heat to be transferred to the outer shell. Smoke generated in battery combustion can be discharged through the exhaust passage, but the energy from flame can be absorbed through the recesses provided in the flame arresting device, thus effectively preventing the spread of flame.

In some embodiments, a heat insulation space is provided between the inner shell and the outer shell, and the heat insulation space is configured to prevent energy transfer through contact-based heat conduction from the inner shell to the outer shell. Physically separating the inner shell from the outer shell avoids bridging heat conduction from the inner shell to the outer shell and can ensure that the temperature of the outer shell remains below a specified safe temperature.

In some embodiments, support members are provided between the outer shell and the inner shell, and the support members support the inner shell so that the heat insulation space is formed between the inner shell and the outer shell. In the explosion-proof box of the embodiments of this application, the outer shell and the inner shell are separated by the support members. With a small number of support members, the inner shell is supported by the outer shell, and the heat insulation space is formed between the inner shell and the outer shell to physically separate the inner shell from the outer shell, avoiding bridging heat conduction from the inner shell to the outer shell, which can ensure that the temperature of the outer shell remains below the specified safe temperature.

In some embodiments, the outer shell includes a heat-resistant material. Such a design ensures that when a battery is burning, the heat generated by combustion is blocked by the heat-resistant material of the outer shell without being conducted to the external environment.

In some embodiments, the inner shell includes a ceramic material. With such a design, when a battery burns, the heat generated by combustion is blocked by the ceramic material of the inner shell without being conducted to the outer shell, achieving the heat dissipation effect.

In some embodiments, ceramic heat insulation panels are arranged around the inner wall of the explosion-proof box. When a battery experiences thermal runaway inside the explosion-proof box, the flame from a burning battery is scorching the ceramic heat insulation panels around the inner wall of the explosion-proof box, and the heat of the flame is first insulated by the ceramic heat insulation panels. Then, a small amount of heat is transferred to the outer shell of the explosion-proof box, and the outer shell provides a secondary block against the transferred heat, ensuring that the temperature on the surface of the explosion-proof box is lower than 100° C.

In some embodiments, the flame arresting device detachably runs through both the outer shell and the inner shell. When a battery burns in the explosion-proof box, the smoke generated during the combustion of the battery in the inner shell can be discharged through the flame arresting device because the flame arresting device runs through the outer shell and the inner shell. The flame arresting device communicates the internal space of the explosion-proof box with the external environment; therefore, the pressure within the inner shell is reduced, and the battery explosion in the explosion-proof box is prevented.

In some embodiments, the recesses are a plurality of metal annular members arranged on the inner surface of the exhaust passage. In such a design, the recesses serve to absorb the flame. In a case that a battery in the explosion-proof box burns, when the flame passes through the exhaust passage, the energy of the flame is absorbed by the plurality of metal annular members arranged on the inner surface of the exhaust passage to prevent the flame from burning into the external environment of the explosion-proof box.

In some embodiments, a bracket is provided in the explosion-proof box, and the batteries are detachably connected to the bracket. With the bracket provided in the explosion-proof box, the batteries can be fixed on the bracket, avoiding collision and impact between the batteries and the inner shell of the explosion-proof box.

In some embodiments, the explosion-proof box is provided with an opening, and the batteries can be placed into and stored in the inner shell through the opening. With the opening provided in the explosion-proof box, the batteries can be placed into or removed from the explosion-proof box when the opening is opened, and can be protected when the opening is closed.

In some embodiments, the opening is provided with a detachable high-temperature resistant sealing strip. Such a design aims to prevent the flame from leaking out of the opening to the external environment of the explosion-proof box, which is advantageous.

In some embodiments, the explosion-proof box further includes a door, and the high-temperature resistant sealing strip is sealed at a gap of the door. The gap of the door of the explosion-proof box is sealed with the high-temperature resistant sealing strip. The high-temperature resistant sealing strip can effectively avoid being melted at high temperatures and causing the flame from spray out.

In some embodiments, corners of the outer shell are made of iron, which enhances the impact strength of explosion-proof box.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments or example technologies. Apparently, the accompanying drawings in the following description show merely some embodiments of this application, and a person of ordinary skill in the art may derive other drawings from these accompanying drawings without creative efforts.

Figure 1:
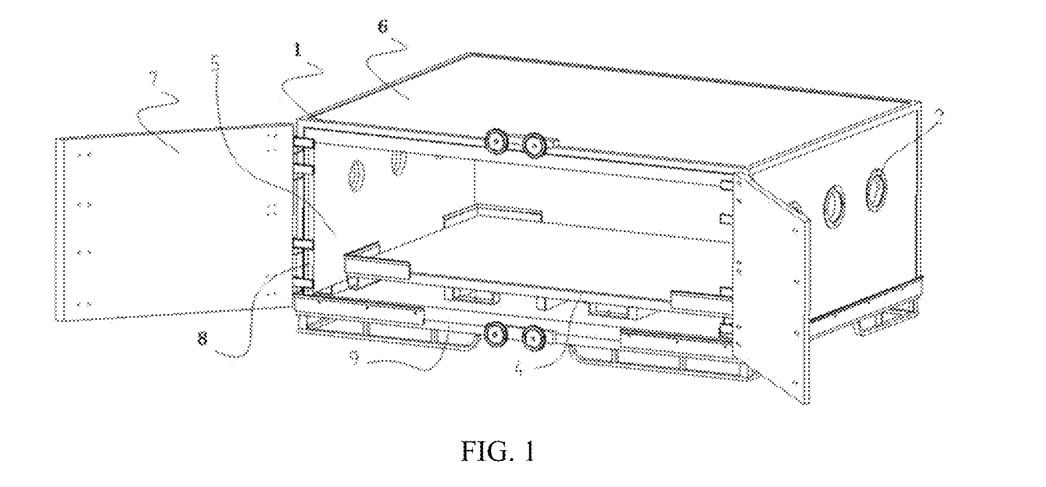
FIG. 1 is a schematic structural diagram of an explosion-proof box for batteries according to some embodiments of this application.

REFERENCE SIGNS IN THE FIGURES 1. sealing strip; 2. flame arresting device; 21. exhaust passage; 23. recess; 4. bracket; 5. heat insulation panel; 6. outer shell; 7. door; 8. inner shell; and 9. frame.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", "have", and any other variations thereof in the specification, claims and brief description of drawings of this application are intended to cover non-exclusive inclusions.

In the description of the embodiments of this application, the technical terms "first", "second", and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mounting", "connection", "join", and "fixing" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

Currently, from a perspective of the market development, application of traction batteries is being more extensive. Traction batteries have been not only used in energy storage power supply systems such as hydroelectric power plants, heat power plants, wind power plants, and solar power plants, but also widely used in many other fields including electric transportation tools such as electric bicycles, electric motorcycles, and electric vehicles, military equipment, and aerospace. With continuous expansion of application fields of traction batteries, market demands for the traction batteries are also expanding.

As applicable scenarios for batteries increase, the demand for battery safety is growing. The explosion-proof box technologies for batteries have undergone development.

A common explosion-proof box is a dual explosion-proof box for batteries with waterproof and explosion-proof features. The waterproof effect of the waterproof and explosion-proof box can help prevent short circuits in the battery. An explosion-proof frame outside the box can effectively prevent damage to the battery from external impacts. There is an automatically controlled lighting apparatus in the box, and a lighting lamp automatically illuminates when the door is opened.

The explosion-proof working principle of this technology involves preventing external factors from detonating the battery product. The use condition of the waterproof and explosion-proof box is that the energy of the battery product itself is controllable and safe. The waterproof and explosion-proof box cannot truly block uncontrolled energy to prevent explosion when the internal energy of the battery is out of control, in order to prevent diffusion of the uncontrolled internal energy of the battery from threatening the safety of surrounding individuals and property.

The technical issue of concern to the applicant is how to block, after a battery (including ferrous lithium phosphate, ternary, lead-acid, fuel, and other series, hereinafter referred to as the battery) is out of control, battery energy against impact diffusion, heat diffusion, and flame diffusion after battery combustion, and effectively control it inside the box.

In some cases, the explosion-proof box for batteries is auxiliary to prevent explosion. However, the explosion-proof box of this application is designed for the transportation and storage of defective batteries.

According to the technical solutions of this application, the explosion-proof box employs a design of double-layered inner and outer walls for heat insulation, and there is no heat conductor running through inside and outside of the explosion-proof box, so as to avoid heat bridging. The explosion-proof box employs a design of double-layered inner and outer walls for heat insulation, and there is no heat conductor running through inside and outside of the box body, so as to avoid heat bridging, which can effectively prevent the temperature inside the box from spreading to the outer surface of the box body and effectively ensure that the surface temperature of the explosion-proof box does not exceed 100 degrees Celsius (° C.).

According to the technical solutions of this application, a structural design of a detachable smoke discharging and flame arresting device is employed. The structural design of the smoke discharging and flame arresting device can effectively prevent extrusion by high-pressure gas generated after battery combustion. The structural design of the smoke discharging and flame arresting device can block the flame to prevent the flame from spraying out of the explosion-proof box while allowing nanoscale carbon powder particles and smoke gas to pass through. The detachable design of the smoke discharging and flame arresting device allows for quick replacement once the device reaches the end of its service life.

According to the technical solutions of this application, the detachable high-temperature resistant sealing strip is used for the door opening gap of the explosion-proof box. The high-temperature resistant sealing strip used for the door opening gap of the explosion-proof box prevents the flame from leaking out of the gap and prevents the temperature from being transferred to the outer surface of the explosion-proof box. The detachable design of the sealing strip allows for quick replacement after its damage.

The explosion-proof box disclosed in the embodiments of this application is mainly used for storage and transportation of battery cells. In particular, the explosion-proof box disclosed in the embodiments of this application is mainly used for storage and transportation of battery cells, battery modules, or battery packs that have already encountered problems, that is, batteries that may undergo combustion and explosion. It can be understood that the battery referred to hereinafter may be a battery cell, a battery module, or a battery pack. However, for convenience, batteries are used as examples below.

The explosion-proof box disclosed in the embodiments of this application is used for batteries, and the battery be used without limitation in electric apparatuses such as vehicles, ships, or aircrafts. The battery cell, battery module, battery pack, or the like disclosed in the embodiments of this application may be used to constitute a power source system of the electric apparatus. This helps to alleviate and automatically adjust for deterioration of cell swelling force, supplement electrolyte consumption, improve the stability of battery performance, and extend battery life.

The explosion-proof box of the embodiments of this application is used for batteries. The battery can be used for an electric apparatus, and the electric apparatus may be but is not limited to a mobile phone, a tablet, a notebook computer, an electric toy, an electric tool, an electric bicycle, an electric car, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

Figure 2:
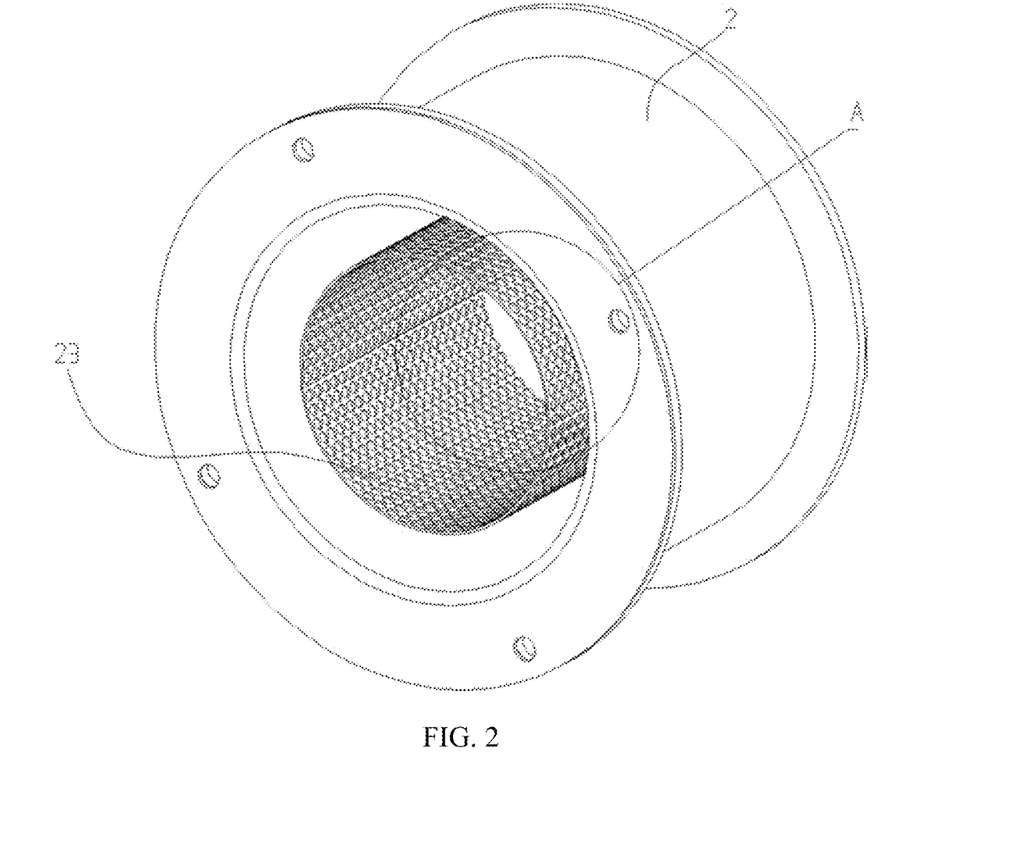
FIG. 2 is a schematic structural diagram of a flame arresting device of an explosion-proof box for batteries according to some embodiment of this application.
Figure 3:
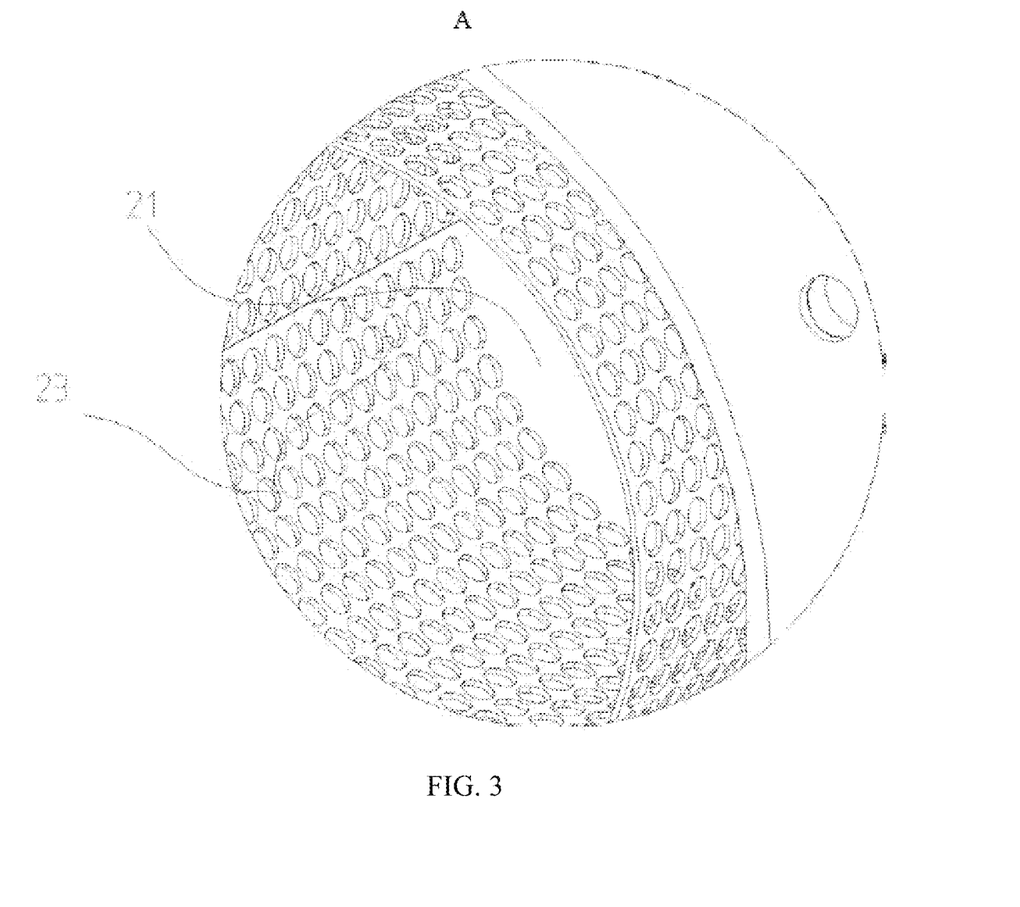
FIG. 3 is a locally enlarged schematic diagram of part A of the flame arresting device of the explosion-proof box for batteries in FIG. 2 according to some embodiment of this application.

According to some embodiments of this application, the embodiments of this application provide an explosion-proof box for batteries. Refer to FIG. 1 to FIG. 3 together. The explosion-proof box includes an outer shell 6, an inner shell 8 positioned inside the outer shell 6, and a flame arresting device 2. The flame arresting device 2 runs through both the outer shell 6 and the inner shell 8. The flame arresting device 2 includes an exhaust passage 21 and recesses 23. The exhaust passage 21 is configured to discharge gases generated within the inner shell 8 to the outside of the outer shell 6. The recesses 23 are disposed on the inner surface of the exhaust passage 21 for absorbing heat energy.

According to some embodiments of this application, the explosion-proof box employs a design of double-layered inner and outer walls for heat insulation, and there is no heat conductor running through inside and outside of the explosion-proof box, so as to avoid heat bridging, which can effectively prevent the temperature inside the explosion-proof box from spreading to the outer surface of the explosion-proof box and effectively ensure that the surface temperature of the explosion-proof box does not exceed 100° C. In the technical solutions of this embodiment of this application, when a battery burns within the explosion-proof box, the energy from flame is insulated by the inner shell 8, allowing only a small amount of heat to be transferred to the outer shell 6. Smoke generated in battery combustion can be discharged through the exhaust passage 21, but the energy from flame can be absorbed through the recesses 23 provided in the flame arresting device 2, thus effectively preventing the spread of flame.

In some embodiments, a heat insulation space is provided between the inner shell 8 and the outer shell 6, and the heat insulation space is configured to prevent energy transfer through contact-based heat conduction from the inner shell 8 to the outer shell 6.

When a battery experiences thermal runaway inside the explosion-proof box, the flame from a burning battery is scorching the ceramic heat insulation panels 5 around the inner wall of the explosion-proof box, and the heat of the flame is first insulated by the ceramic heat insulation panels 5. Then, a small amount of heat is transferred to the outer shell 6 of the explosion-proof box, and a high heat-resistant material is also used for the outer shell 6 of the explosion-proof box to provide a secondary block against the transferred heat, ensuring that the temperature on the surface of the explosion-proof box is lower than 100° C.

Physically separating the inner shell 8 from the outer shell 6 avoids bridging heat conduction from the inner shell 8 to the outer shell 6 and can ensure that the temperature of the outer shell 6 remains below a specified safe temperature.

In some embodiments, support members are provided between the outer shell 6 and the inner shell 8, and the support members support the inner shell 8 so that the heat insulation space is formed between the inner shell 8 and the outer shell 6.

The support members may be embedded bolts. With use of the embedded bolts, point contact is established between the inner shell 8 and the outer shell 6 instead of surface contact, creating a spatial gap between the inner shell 8 and the outer shell 6.

In the explosion-proof box of the embodiments of this application, the outer shell 6 and the inner shell 8 are separated by the support members. With a small number of support members, the inner shell 8 is supported by the outer shell 6, and the heat insulation space is formed between the inner shell 8 and the outer shell 6 to physically separate the inner shell 8 from the outer shell 6, avoiding bridging heat conduction from the inner shell 8 to the outer shell 6, which can ensure that the temperature of the outer shell 6 remains below the specified safe temperature.

In some embodiments, the outer shell 6 includes a heat-resistant material.

The outer shell 6 of the explosion-proof box may be made of ultra-high performance concrete.

The manufacturing of high performance concrete is abbreviated as UHPC (Ultra-High Performance Concrete). The UHPC material is capable of withstanding high-strength impact. Adding a water reducer and ultra-fine powder to concrete greatly enhances the strength of concrete. The water reducer greatly reduces the moisture content in the concrete. Ultra-fine powder is added as an admixture to the concrete mix, with thorough stirring to effectively reduce gaps between aggregates, minimize the mass of mixed air, and increase the material density. The concrete treated with the above methods is known as HPC (High Performance Concrete, high performance concrete), and theoretically, the compressive strength of HPC can reach 120 megapascals (MPA).

The outer shell 6 of the explosion-proof box are reinforced with iron corners to enhance the impact strength of the explosion-proof box.

Such a design ensures that when a battery is burning, the heat generated by combustion is blocked by the heat-resistant material of the outer shell 6 without being conducted to the external environment.

In some embodiments, the inner shell 8 includes a ceramic material.

Ceramic materials refer to a type of inorganic nonmetallic materials made through shaping and high-temperature sintering of natural or synthetic compounds. Such materials possess advantages such as high melting point, high hardness, high wear resistance, and oxidation resistance. Ceramic materials generally have high melting points (mostly above 2000° C.) and exhibit excellent chemical stability at high temperatures. The heat conductivity of ceramics is lower than that of metal materials, and ceramics are also good heat insulation materials. In addition, ceramics have a lower linear expansion coefficient compared with metals, and ceramics have good dimensional stability when temperatures fluctuate. The radiation mechanism of ceramic materials is generated by the non resonant effects of random vibrations of two phonons and multiple phonons. High radiation ceramic materials, such as silicon carbide, metal oxide, and boride, all have extremely strong infrared activated polar vibration. These polar vibrations have extremely strong anharmonic effects, and their dual-frequency and frequency-region absorption coefficients generally have the order of 100 to 100 centimeter (cm)-1, which is equivalent to the lower reflectivity of the residual reflection band of the medium intensity absorption zone in this region. Therefore, it is conducive to the formation of a relatively flat strong radiation band.

Generally speaking, the radiation band with high thermal radiation efficiency roughly extends from the strong resonance wavelength to the entire two-phonon combination and frequency region of the short wave, including part of the multi-phonon combination region. This is a common feature of most high-radiation ceramic materials. It can be said that the strong radiation band mainly originates from the two-phonon combined radiation in this band. With a few exceptions, the radiation band of radiation ceramics is generally concentrated in the two-phonon and three-phonon regions greater than 5 meters (m). Therefore, for infrared radiation ceramics, the radiation in the 1-5 m band mainly comes from intra band transitions of free carriers or direct transitions of electrons from impurity levels to conduction bands, while radiation in bands greater than 5 m is mainly attributed to two-phonon combination radiation.

With such a design, when a battery burns, the heat generated by combustion is blocked by the ceramic material of the inner shell 8 without being conducted to the outer shell 6, achieving the heat dissipation effect.

In some embodiments, the flame arresting device 2 detachably runs through both the outer shell 6 and the inner shell 8.

According to some embodiments of this application, a structural design of a detachable smoke discharging and flame arresting device 2 is employed. The structural design of the smoke discharging and flame arresting device 2 can effectively prevent extrusion by high-pressure gas generated after battery combustion. The structural design of the smoke discharging and flame arresting device 2 can block the flame to prevent the flame from spraying out of the outer shell 6 of the explosion-proof box while allowing nanoscale carbon powder particles and smoke gas to pass through. The detachable design of the smoke discharging and flame arresting device 2 allows for quick replacement once the device reaches the end of its service life.

The flame arresting device 2 may be a pipe flame arresting device. A pipe flame arresting device is a safety device used to prevent hydrogen flame from spreading outward. It is composed of a solid material (flame arresting element) with many small channels or gaps that allow passage of gas. The gaps or channels of the flame arresting element are required to be as small as possible, so that upon entering the flame arresting device, the flame is divided into many small flame streams by the flame arresting element. Due to the heat transfer effect (cooling of the gas) and the wall effect, the flame streams are suddenly extinguished.

When a battery burns in the explosion-proof box, the smoke generated during the combustion of the battery in the inner shell 8 can be discharged through the flame arresting device 2 because the flame arresting device 2 runs through the outer shell 6 and the inner shell 8. The flame arresting device 2 communicates the internal space of the explosion-proof box with the external environment; therefore, the pressure within the inner shell 8 is reduced, and the battery explosion in the explosion-proof box is prevented.

In some embodiments, the recesses 23 are a plurality of metal annular members arranged on the inner surface of the exhaust passage 21.

The flame arresting device is designed and manufactured based on the principle that the flame extinguishes due to heat loss when passing through narrow pores of a heat conductor. A flame arresting layer structure of the flame arresting device includes gravel type, wire mesh type, or corrugated type. Most flame arresting devices are made of solid materials with numerous small, uniform, or nonuniform channels or pores that allow passage of gas. These channels or pores are required to be as small as possible, just enough to allow passage of flame. In this way, upon entering the flame arresting device, the flame is divided into many small flame streams that are extinguished. The mechanism behind flame extinction involves heat transfer and the wall effect.

When detonation occurs in the pipe, the flame passes through narrow metal channels and transfers some heat to the metal walls, and this process results in heat loss. More heat is lost in flight when the flame traverses through narrower channels. Certainly, to ensure that the flame can be effectively extinguished, the spacing between the metal channels needs to match the explosive mixture. Through experiments, a maximum spacing for each substance can be determined, thereby establishing specifications and characteristics of the flame arresting device to ensure that the flame can be effectively extinguished.

One of the necessary conditions for combustion is reaching a certain temperature, that is, the ignition point. Below the ignition point, the combustion ceases. Following this principle, as long as the temperature of the combusting substance is lowered below its ignition point, the spread of flame can be prevented. The flame that passes through many small channels of the flame arresting element becomes several small flames. The flame arresting element should enlarge the contact area between the small flames and the channel walls as much as possible and strengthen the heat transfer, lowering the flame temperature below the ignition point to prevent the spread of flame.

Wall Effect of Flame Arresting Device

Combustion is not direct reactions between molecules, but is stimulated by external energy. Molecular bonds are destroyed and activated molecules are produced. The activated molecules are split into short-lived but highly active free radicals. These free radicals collide with other molecules to generate new products, and new free radicals are also generated to continue to react with other molecules.

When a burning combustible gas passes through the narrow channels of the flame arresting element, the probability of collision between free radicals and the channel walls increases, and the number of active free radicals participating in the reactions decreases. As the channels of the flame arresting device are narrow to a certain extent, collisions between free radicals and the channel walls become predominant. The reactions cannot continue because of a sharp decrease in the number of free radicals, in other words, the combustion reaction cannot continue to propagate through the flame arresting device.

With the decrease in the channel size of flame arresting device, the probability of collision between free radicals and reactive molecules decreases, while the probability of collision between free radicals and the channel walls increases, leading to a reduction in free radical reactions. When the channel size is reduced to a certain value, this wall effect creates a condition where the flame cannot continue to propagate, and the flame is blocked. Therefore, the wall effect is a main mechanism for preventing flame.

The flame passes through the small channels of the flame arresting element and cools down in the channels. When the flame is divided to a certain extent, the heat removed through the channels is enough to lower the temperature below the ignition point of combustible materials and extinguish the flame.

Based on the explanation of wall effect, when the channels are narrow to a certain extent, collisions between free radicals and the channel walls become predominant. With a significant reduction in free radicals, the combustion reaction cannot continue. Therefore, a channel size that is just enough to extinguish a flame under specific conditions (0.1 MPa, 20° C.) is defined as the "maximum experimental safety gap" (MESG, Maximum Experimental Safe Gap). The channel size of the flame arresting element is a key factor for determining the performance of a flame arresting device, and different gases have different MESG values.

As shown in FIG. 1 to FIG. 3, when the flame from a burning battery is scorching a flame arresting device 2, the heat of the flame passing through the recesses 23 in the flame arresting device 2 is instantly absorbed due to heat transfer, resulting in the flame not passing through the flame arresting device 2. In addition, ceramic heat insulation panels are used for the inner shell 8 of the explosion-proof box and a high heat-resistant material is used for the outer shell 6 of the explosion-proof box, so that the flame is controlled in the vicinity of the flame arresting device 2 without being spread. The recesses 23 may be narrow and small metal pores.

In such a design, the recesses 23 serve to absorb the flame. In a case that a battery in the explosion-proof box burns, when the flame passes through the exhaust passage 21, the energy of the flame is absorbed by the plurality of metal annular members arranged on the inner surface of the exhaust passage 21 to prevent the flame from burning into the external environment of the explosion-proof box.

In some embodiments, a bracket 4 is provided in the explosion-proof box, and the batteries are detachably connected to the bracket 4.

As shown in FIG. 1, the bracket 4 and the entirety of the explosion-proof box feature a detachable design, allowing for the fixation of heavy-duty batteries in the explosion-proof box and the convenient removal of the heavy-duty batteries from the explosion-proof box.

With the bracket 4 provided in the explosion-proof box, the batteries can be fixed on the bracket 4, avoiding collision and impact between the batteries and the inner shell 8 of the explosion-proof box.

In some embodiments, the explosion-proof box is provided with an opening, and the batteries can be placed into and stored in the inner shell 8 through the opening.

As shown in FIG. 1, the door 7 of the explosion-proof box is opened, the bracket 4 is removed out with a forklift, the batteries to be transported are fixed on the bracket 4, then the bracket 4 together with the batteries are placed in the explosion-proof box with the forklift, and the door 7 of the explosion-proof box is closed and locked securely.

With the opening provided in the explosion-proof box, the batteries can be placed into or removed from the explosion-proof box when the opening is opened, and can be protected when the opening is closed.

In some embodiments, the opening is provided with a detachable high-temperature resistant sealing strip 1.

According to some embodiments of the application, the detachable high-temperature resistant sealing strip 1 is used for the door opening gap of the explosion-proof box. The high-temperature resistant sealing strip 1 used for the door opening gap of the explosion-proof box prevents the flame from leaking out of the gap and prevents the temperature from being transferred to the outer surface of the box body. The detachable design of the sealing strip 1 allows for quick replacement after its damage.

When there is a fire inside the explosion-proof box and the temperature reaches a certain value, the fire-proof and flame-retardant sealing strip 1 can isolate the air circulation in this case, in order to prevent the spread of flame. So, the role of the fire-proof and flame-retardant sealing strip 1 is also quite significant.

A main raw material used in the production of the fire-proof and flame-retardant sealing strip 1 is expandable graphite, and these products also have certain advantages. For example, expandable graphite is derived from natural flake graphite through chemical treatment, and in this case, the fire-proof and flame-retardant sealing strip 1 is produced mainly using the expandable graphite with a binder. In some embodiments, the sealing strip 1 expands rapidly at temperatures above 200° C., rendering its high flexibility, and the sealing strip 1 also exhibits excellent resistance to cold, water, acids, alkalis, and salts, showing distinct advantages that can effectively prevent the spread of flame during use.

Due to its expandability and high-temperature resistance, expandable graphite becomes an excellent sealing material and is widely used in the fire-proof sealing strip 1. Expandable graphite materials are mixed, vulcanized, and molded with rubber materials, inorganic flame retardants, accelerators, vulcanizing agents, reinforcing agents, fillers, and the like to produce expandable sealing strips of various specifications. Additionally, expandable graphite can be bonded to a carrier using a specific binder, and the shear resistance provided by the carbonized substance formed by this binder at high temperatures can effectively prevent the sliding of graphite. Expandable graphite as a flame retardant for plastic materials is a good flame retardant for plastic materials, with characteristics of non-toxicity and pollution-free, and can achieve an ideal flame retardant effect whether used on its own or combined with other flame retardants. Expandable graphite is used in a much smaller amount than ordinary flame retardants with a same flame retardant effect achieved. Its working principle is that at high temperatures, expandable graphite expands rapidly, suffocating the flame. At the same time, a generated graphite expanded material covers a surface of a substrate, isolating thermal radiation and oxygen contact. The acid radicals inside the interlayer are released during expansion, which also promotes the carbonization of the substrate, achieving good results through various flame retardant methods.

Expandable graphite fine particles applied in coatings can be added to ordinary coatings to produce flame-retardant and anti-static coatings with good effects, improving their high-temperature resistance and fire-proof performance. A large amount of lightweight non-combustible carbon layer formed in a fire can effectively block the radiation of heat to a substrate and protect the substrate. In addition, as graphite is a good electrical conductor, the coating prepared can prevent the accumulation of static charges to achieve a dual effect of fire and static electricity prevention.

As shown in FIG. 1, the flame from the burning battery is scorching at the gap of the door 7 of the explosion-proof box. The gap of the door 7 of the explosion-proof box is sealed with the high-temperature resistant sealing strip 1. The high-temperature resistant sealing strip 1 can effectively avoid being melted at high temperatures and causing the flame to spray out.

Such a design aims to prevent the flame from leaking out of the opening to the external environment of the explosion-proof box, which is advantageous.

According to some embodiments of the application, the use of the explosion-proof box is shown in FIG. 1. The door 7 of the explosion-proof box is opened, the battery bracket 4 is removed out with a forklift, the batteries to be transported are fixed on the bracket 4, then the bracket 4 together with the batteries is placed in the explosion-proof box with a forklift, and the door 7 of the explosion-proof box is closed and locked securely. The battery bracket 4 and the entirety of the explosion-proof box feature a detachable design, making it easy for the heavy-duty batteries to be fixed in, loaded into, or removed from the explosion-proof box.

The outer shell 6 of the explosion-proof box made of UHPC material can withstand high-strength impact. The outer shell 6 of the explosion-proof box are reinforced with iron corners to enhance the impact strength of the explosion-proof box.

When thermal runaway occurs inside a battery, the energy of the flame is generally transferred outward in three ways.

Flame Energy Transfer Path 1

The flame from a burning battery is scorching the ceramic heat insulation panels 5 around the inner wall of the explosion-proof box, and the heat of the flame is first insulated by the ceramic heat insulation panels 5. Then, a small amount of heat is transferred to the outer shell 6 of the explosion-proof box, and a high heat-resistant material is also used for the outer shell 6 of the explosion-proof box to provide a secondary block against the transferred heat, ensuring that the temperature on the surface of the box body is lower than 100° C.

Flame Energy Transfer Path 2

The flame from a burning battery is scorching the smoke discharging and flame arresting device 2. The heat of the flame passing through the narrow and small metal pores in the smoke discharging and flame arresting device 2 is instantly absorbed due to heat transfer, resulting in the flame not passing through the flame arresting device 2. In addition, because ceramic heat insulation panels are used for the inner wall of the explosion-proof box and a high heat-resistant material is used for the outer shell 6 of the explosion-proof box, the flame is controlled in the vicinity of the smoke discharging and flame arresting device 2 without being spread.

Flame Energy Transfer Path 3

The flame from a burning battery is scorching at the gap of the door 7 of the explosion-proof box. The gap of the door 7 of the explosion-proof box is sealed with a high-temperature resistant sealing strip 1. The high-temperature resistant sealing strip 1 can effectively avoid being melted at high temperatures and causing the flame to spray out.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. An explosion-proof box for batteries, comprising:
   an outer shell;
   an inner shell, the inner shell being positioned inside the outer shell;
   a bracket inside the explosion-proof box; and
   a flame arresting device, the flame arresting device extending through both the outer shell and the inner shell, wherein the flame arresting device comprises:
     an exhaust passage configured to discharge gases generated within the inner shell to an outside of the outer shell; and
     recesses disposed on an inner surface of the exhaust passage for absorbing heat energy,
   wherein the recesses are a plurality of metal annular members arranged on the inner surface of the exhaust passage, and
   wherein the batteries are detachably connectable to the bracket.

2. The explosion-proof box for batteries according to claim 1, wherein a heat insulation space is provided between the inner shell and the outer shell, and the heat insulation space is configured to prevent energy transfer through contact-based heat conduction from the inner shell to the outer shell.

3. The explosion-proof box for batteries according to claim 2, wherein support members are provided between the outer shell and the inner shell, and the support members support the inner shell so that the heat insulation space is formed between the inner shell and the outer shell.

4. The explosion-proof box for batteries according to claim 3, wherein the support members are embedded bolts.

5. The explosion-proof box for batteries according to claim 1, wherein the outer shell comprises a heat-resistant material.

6. The explosion-proof box for batteries according to claim 1, wherein the inner shell comprises a ceramic material.

7. The explosion-proof box for batteries according to claim 1, wherein ceramic heat insulation panels are arranged around an inner wall of the explosion-proof box.

8. The explosion-proof box for batteries according to claim 1, wherein the flame arresting device detachably extends through both the outer shell and the inner shell.

9. The explosion-proof box for batteries according to claim 1, wherein the explosion-proof box is provided with an opening, and the batteries are capable of being placed into and stored in the inner shell through the opening.

10. The explosion-proof box for batteries according to claim 9, wherein the opening is provided with a detachable high-temperature resistant sealing strip.

11. The explosion-proof box for batteries according to claim 10, wherein the explosion-proof box further comprises a door, and the high-temperature resistant sealing strip is sealed at a gap of the door.

12. The explosion-proof box for batteries according to claim 1, wherein corners of the outer shell are made of iron.

* * * * *